United States Patent [19]

Abdel-Mottaleb

[11] Patent Number: 5,768,406
[45] Date of Patent: Jun. 16, 1998

[54] MASS DETECTION IN DIGITAL X-RAY IMAGES USING MULTIPLE THRESHOLD LEVELS TO DISCRIMINATE SPOTS

[75] Inventor: Mohamed Abdel-Mottaleb, Ossining, N.Y.

[73] Assignee: Philips Electronics North America, New York, N.Y.

[21] Appl. No.: 699,182

[22] Filed: Aug. 19, 1996

Related U.S. Application Data

[63] Continuation of Ser. No. 274,939, Jul. 14, 1994, abandoned.

[51] Int. Cl.[6] .............................. G06K 9/00; G06K 9/38
[52] U.S. Cl. ............................................ 382/132; 382/270
[58] Field of Search ........................... 382/128, 132–133, 382/203–204, 270–273; 364/413.13, 413.22; 358/466

[56] References Cited

U.S. PATENT DOCUMENTS

| 4,236,078 | 11/1980 | Kotera et al. | 250/363 R |
|---|---|---|---|
| 4,515,165 | 5/1985 | Carroll | 128/664 |
| 4,851,984 | 7/1989 | Doi et al. | 364/413.23 |
| 4,907,156 | 3/1990 | Doi et al. | 364/413.13 |
| 5,003,979 | 4/1991 | Merickel et al. | 364/413.13 |
| 5,133,020 | 7/1992 | Giger et al. | 382/128 |
| 5,212,637 | 5/1993 | Saxena | 364/413.26 |
| 5,289,374 | 2/1994 | Doi et al. | 364/413.13 |

FOREIGN PATENT DOCUMENTS

| 2622714 | 5/1989 | France . |
| 9107135 | 5/1991 | WIPO . |
| 9514979 | 6/1995 | WIPO . |

OTHER PUBLICATIONS

"Detection of Breast Asymmetry Using Anatomical Features" P. Miller et al, SPIE Conference, vol. 1905, pp. 433–442, 1993.

"Computer Screening of Xeromammograms: A Technique for Defining Suspicious Areas of the Breast" W. Hand et al, Computers and Biomedical Research, 12, pp. 445–460, 1979.

"Computer Vision" D. Ballard et al, Prentice Hall, Chapter 4.

"Automatic Detection of Suspicious Abnormalities in Breast Radiographs" B. Kimme et al, Data Structures, Computer Graphics and Pattern Recognition pp. 427–447, date unknown.

"A Fully Automated System for Screening Xeromammograms" J. Semlow et al, Comput. Biomed. Res. 13, 1980, pp. 350–362.

"Automated Detection of Breast Tumors Using the Asymmetry Approach" Comput. and Biomed. Res. 24, pp. 273–295, 1991.

"Automated Detection and classification of Breast Tumors" S. NG et al, Comput. and Biomed. Research 25, 1992, pp. 218–237.

"Detection of Radiographic Abnormalities in Mammograms by Means of Optical Scanning and Computer Analysis" F. Winsberg et al, Radiology, vol. 89, 1967.

"An Approach to Automated Detection of Tumors in Mammograms" D. Brzakovic et al, IEEE Trans. Med. Imag. 9, 1990.

On Techniques for Detecting Circumscribed Masses in Mammograms, S. Lai et al IEEE Trans. Med. Imag. 8, 1989.

(List continued on next page.)

*Primary Examiner*—Leo H. Boudreau
*Assistant Examiner*—Bhavesh Mehta
*Attorney, Agent, or Firm*—Jack D. Slobod

[57] ABSTRACT

A digital radiologic image, notably a mammogram, is automatically processed by a computer to identify suspect masses. The identification is done by thresholding at least a region of interest of the image at, at least, 20 threshold levels determined from a histogram of the image to discriminate spots, and classifying the spots by size, shape and variance in intensity of the pixels comprising the spot. A processed mammogram having the suspect masses marked or enhanced is produced and displayed.

4 Claims, 3 Drawing Sheets

OTHER PUBLICATIONS

"Computer Aided Detection and Diagnosis of Masses and Clustered Microcalcifications from Digital Mammograms" R. Nishikawa et al. SPIE vol. 1905 pp. 422–432, 1993.

"Breast Lesion Classification by Computer and Xeroradiography" Ackerman et al. Cancer, vol. 30, pp. 1025–1035.

"Restoration of Mammographic Images Acquired by a New Fast Digitization System" Aghdasi et al. Image Processing Algorithms and Techniques III, SPIE vol. 1657.

"Automated Detection of Microcalcification Clusters in Mammograms" S/CAR 90 Comp. App. to Assist Radiology, pp. 137–143, Bankman et al 1967.

Computer Aided Detection of Microcalcifications in Mammograms–Methodology and Preliminary Clinical Study, Chan et al. Investigative Radiology, vol. 23, pp. 664–671.

"Image Feature Analysis and Computer Aided Diagnosis in Digital Radiography" Chan et al. Medical Services, vol. 14, No. 4, pp. 538–548, Jul. 1987.

"Automatic Detection of Microcalcifications in Digital Mammograms Using Local Area Thresholding Techniques" Medical Imaging III, Image Processing, vol. 1092, pp. 153–159, SPIE 1989.

"Digital Mammography: Supervised and Unsupervised (Automatic) Methods for Image Enhancement, Segmentation and Pattern Recognition" Clarke.

"The Automatic Computer Detection of Subtle Calcifications in Radiographically Dense Breasts" Davies et al. Phys. Med. Biol. 1972, vol. 37, No. 6 pp. 1385–1390.

"Automatic Computer Detection of Clustered Calcifications in Digital Mammograms" Davies et al. Plys. Med. Biol. vol. 35, No. 8, 1112–1118, 1980 1967.

"Segmentation of Microcalcifications in Mammograms" Dengler et al. Submitted to IEEE Transactions on Medical Imaging, 1991.

"Mammographic Feature Enhancement by Computerized Imge Processing" Dhawan et al. Computer Methods and Programs in Biomedicine, vol. 27, pp. 23–35 1988.

"Algorithm for Detection of Fine Clustered Calcifications" Fam et al. Radiology, vol. 169, pp. 333–337, Nov. 1988.

"The Detection of Calcification Clusters in Film–Screen Mammograms" A Detailed Algorithmic Approach Fam et al. Medical Imaging II, vol. 914, pp. 620–634, SPIE 1988.

"A Computer Analysis of Mammographic Microcalcifications: Global Appraoch" Fox et al. IEEE 1980, Proceedings of the 5th International Conf. on Pattern Recognition. pp. 624–631.

"Evaluation of Mammographic Calcifications Using a Comptuer Program" Wee et all. Radiology, vol. 11, pp. 717–720 Sep. 1975.

"Image Processing for Recognition of Tumor on Mammography" Yabashi et al. Proceedings of the 1989 International Symposium on Noise and Cluster Rejection in Radars and Image Sensors, IEICE 1989.

"Computerized Detection of Masses in Digital Mammograms . . . " Yin et al. Medical Physics, 18(5) Sep. Oct. 1991.

"Mammogram Inspection by Computer" W. Spieberger, IEEE Transactions on Biomedical Engineering, vol. BME 26, No. 4, Apr. 1979, pp. 213–219.

"Extraction and Measurement of Lesion Edge Blur in Mammograms by Computer Image Analysis" J.H. Richter et al. School of Computer Science, The University of Birmingham, Birmingham, U.K.

MASS DETECTION IN DIGITAL X-RAY IMAGES USING MULTIPLE THRESHOLD LEVELS TO DISCRIMINATE SPOTS

This is a continuation of application Ser. No. 08/274,939, filed Jul. 14, 1994 now abandoned.

BACKGROUND OF THE INVENTION

1. Field of the Invention

The present invention relates generally to methods of and systems for computer aided diagnosis of radiologic images. In its more particular respects, it relates to identification of spots that may correspond to suspect masses. The invention is particularly pertinent to computer-aided diagnosis of mammograms but is also useful with respect to other common radiologic images, for example, chest X-rays.

2. Description of the Related Art

A method of this general type for detection of suspect masses, nodules or tumors is known from U.S. Pat. No. 5,212,637 and from U.S. Pat. No. 4,907,156.

Breast cancer is one of the primary causes of death for women in western societies. Because the vast majority of deaths due to cancer that originated in the breast could be prevented by early detection, national health organizations in the United States recommend that all women over the age of 50 have regular screening mammograms. If these recommendations were followed by all women, the number of mammograms taken and read in the U.S. would overload the current capacity.

The reading or interpretation of screening mammograms is an art that requires extensive experience and attentiveness to detail. The mammographer's primary sign for cancer is a moderately sized spot identified as an abnormal mass. Another sign is the presence of relatively small spots corresponding to minute deposits of calcium salts known as microcalcifications, which are arranged in clusters. Both the number of mammograms to be interpreted and the difficulty of identifying the aforementioned and other not easily recognizable signs of malignancy motivate developments in Computer-Aided Diagnosis of Mammograms (CADM) to at least automatically mark or enhance features of interest, including suspect areas, in images displayed on a monitor for interpretation by the mammographer.

Digital mammograms suitable for computer-aided diagnosis may be obtained by scanning film taken by conventional X-ray mammography or by utilizing other X-ray detector types that produce electronic image signals that may be directly digitized without the necessity of producing a film intermediate. These detector types include X-ray image intensifier/camera chain, photostimuable phosphor plate/laser readout (see U.S. Pat. No. 4,236,078), and selenium plate/electrometer readout technologies. Such technologies are progressing in their spatial resolution and contrast sensitivities achieved and the latter two, particularly, may soon find widespread use for mammographic applications.

In U.S. Pat. No. 5,212,637, a search for masses in different intensity ranges utilizes a calculated initial threshold value which threshold value is incremented no more than three times. "Blobs" produced by thresholding the mammogram at the initial or at an incremented threshold value, which correspond to regions having a sufficient prominence in intensity with respect to their immediate surround are classified as "potentially malignant" based on their size and shape, i.e. area, circularity, and eccentricity.

In U.S. Pat. No. 4,907,156, "islands" are produced by thresholding a difference image determined from a digital X-ray image. The threshold level is successively decreased to values producing a 1% change in the area under a histogram of the pixel values in the difference image. In general, the islands grow as the threshold level is decreased. At each threshold level, the shape and size of the islands are analyzed. An island is classified as a nodule if it has either (1) an effective diameter of between 3 and 18 mm and a circularity of at least 0.85 for ten consecutive threshold levels, or (2) an effective diameter of between 9 and 18 mm and a circularity of at least 0.75 for four consecutive threshold levels.

Such methods may yield false negative results by not detecting an abnormal spot that may only be discriminated within a limited range of intensity threshold values. Further, the aforementioned methods may yield an unacceptable number of false positive results, particularly when attempting to increase their sensitivity.

SUMMARY OF THE INVENTION

It is an object of the present invention to provide a method and apparatus for aiding diagnosis of suspect spots in radiologic images which reduces the incidences of false negative results to substantially zero by utilizing a large number of relevant threshold levels while maintaining the incidence of false positive results to acceptable levels, e.g. on average, no more than one improperly marked spot per image.

Briefly, these and other objects are satisfied by using a histogram of the gray levels of pixels in a radiologic image whose background has been removed from consideration to determine a relevant interval of gray levels, and thresholding the resulting image at each gray level in the interval. Typically, in an 8 bit (256 gray level) image, the relevant interval contains at least 20 and typically more than 50 different gray levels. The image resulting from each thresholding operation is separately analyzed to determine connected regions or spots, and to classify which connected regions are suspect. At each gray level in the interval, pixels that belong to a suspect connected region are marked. This marking process is cumulative, since, after thresholding at each gray level in the interval, all pixels belonging to a suspect connected region in a binary image produced at any threshold level in the interval have been marked.

The determination of which connected regions are suspect is done by forming measures of their respective size, shape and intensity variance or uniformity. Each connected region whose measures all meet predetermined criteria are designated as suspect. The inclusion of an intensity variance or uniformity criterion is because a typical suspect mass appears to have a relatively uniform intensity throughout its area.

Thresholding at each gray level in a relatively large interval of relevant levels, tends to produce a 100% sensitivity in identifying suspect masses. The maintenance of a low rate of false positives is aided by the inclusion of the criterion requiring that the pixels of a connected region have low variance or high uniformity in intensity. This criterion, among other things, prevents substantially hollow connected regions from being designated as suspect.

BRIEF DESCRIPTION OF THE DRAWING

Other objects, features and advantages of the invention will become apparent upon perusal of the following detailed description when taken in conjunction with the appended drawing, wherein.

DETAILED DESCRIPTION OF THE PREFERRED EMBODIMENTS

Figure 1:
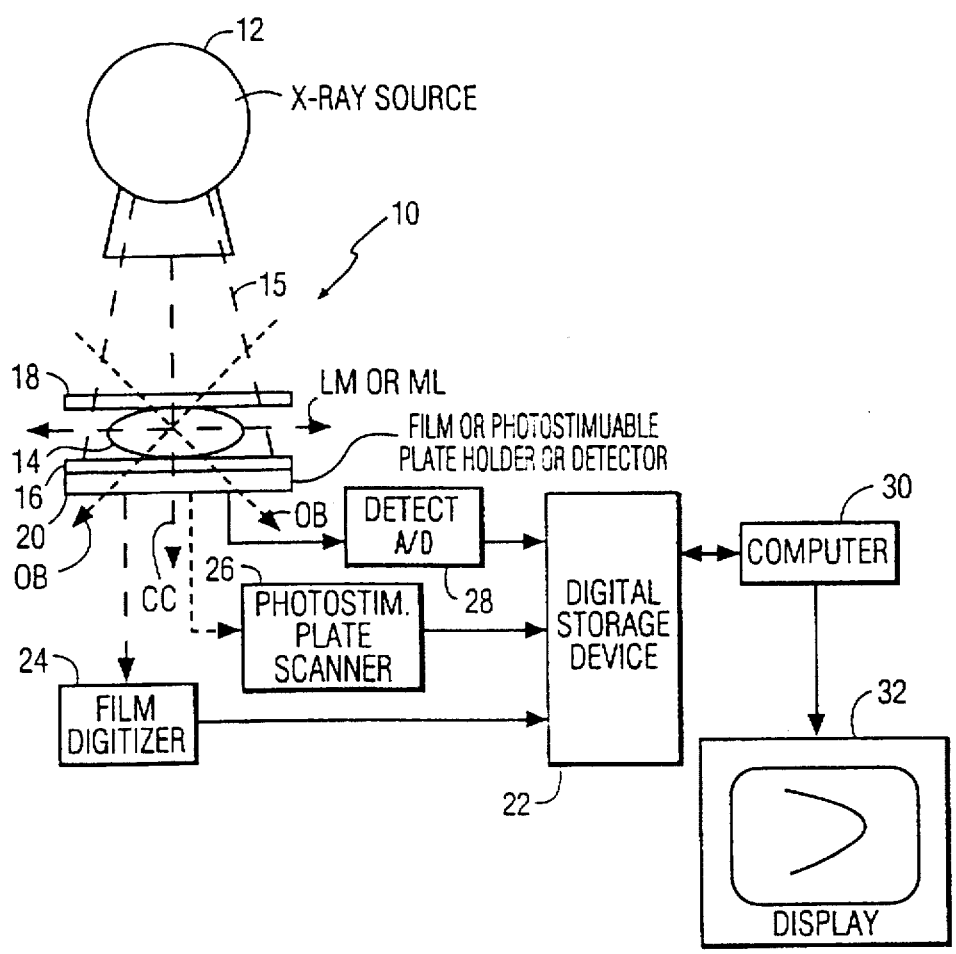
FIG. 1 is a schematic diagram of a computer-aided system in accordance with the invention for taking and processing mammograms.

Referring first to FIG. 1, there is shown a computer-aided mammography system 10, with its mammogram taking parts arranged for a cranio-caudal (CC) view, including an X-ray source 12 directed to irradiate a breast 14 of a standing subject with an X-ray beam 15. The breast 14 is received and compressed between generally planar lower and upper members 16, 18, using a predetermined compression force or weight. Below lower member 16 is a two-dimensional X-ray detector means 20 for detecting within a rectangular field of pixels, the X-ray radiation passing through breast 14 and its immediate external surround. X-ray detector means 20 is alternatively a film or a photostimuable phosphor image plate received in a holder, or a selenium plate/electrometer readout detector. An X-ray image intensifier/camera chain is also a suitable detector means. The X-ray source 12, plates 14 and 16 and detector means 20 may be rotated as a unit about transverse axis A to receive and irradiate breast 14 along any of the viewing directions labelled in FIG. 1 as CC (cranio-caudal), LM or ML (latero-medial or medial-lateral) and OB (oblique).

Whichever detector means 20 type is used, ultimately there is a two-dimensional array of digital pixels, representing the mammogram X-ray projection image, stored as an image file in a digital storage device 22 which may comprise a RAM, hard disk, magneto-optical disk, WORM drive, or other digital storage means. When film is used, it is developed and then scanned in a digitizer 24. Today, films may be digitized to 100 micron spatial resolution, yielding typical images ranging in size from 1672×2380 to 2344×3016 pixels, each up to 12 bit intensity resolution. When a photostimuable plate is used, it is scanned by a laser in scanner 26 yielding a similar image size and typically 10 bit intensity resolution. Lastly, when a detector such as a selenium plate/electrometer readout device is utilized, it directly produces analog electrical signals that are converted to digital form by its analog to digital converter 28.

The two-dimensional array of digital pixels stored in device 22, representing the mammogram, is processed by computer workstation 30 to mark or enhance features of interest in the mammogram, including any identified suspect masses or clusters of microcalcifications, and display the resultant processed mammogram on display device 32, such as a CRT monitor. As a preliminary step, the stored mammogram may be reduced in resolution, spatially by a suitable median filter, and/or in amplitude by truncation, to an image on the order of 500,000 to 2,500,000 pixels and 8-bit to 10-bit intensity resolution consistent with the spatial and gray scale resolution of the monitor. In the processing to mark or enhance features, the mammogram is segmented into foreground, corresponding to the breast, and background, corresponding to the external surround of the breast and the skinline is detected in the course of this segmentation. The segmentation allows background to be eliminated from the search for features of interest, such as masses or clusters of microcalcifications, to be marked or enhanced. The segmentation may be performed by the method described in U.S. patent application Ser. No. 08/175, 805, filed Dec. 30, 1993, entitled "Automatic Segmentation and Skinline Detection in Digital Mammograms", which is assigned to the same assignee as the present application and is hereby incorporated herein by reference. The identification of suspect clusters of microcalcifications is described in U.S. patent application, Ser. No. 08/003,071, filed Jan. 11, 1993, entitled "Computer Detection of Microcalcifications in Mammograms", which is also assigned to the same assignee as the present invention. The latter application is also hereby incorporated herein by reference.

Now referring to the flowchart shown in FIG. 2, the identification of suspect masses in a two-dimensional mammogram projection image will be described. It is assumed that as referred to heretofore, the original mammogram has been reduced in spatial resolution to about 250,000 pixels (e.g. 480×520) and segmentation has already taken place by skinline detection. As a result, each pixel in the background has been removed from further consideration in the search for features of interest. Then, in step 34, a histogram of the gray values of the pixels in the foreground is calculated and a relevant interval of gray levels for thresholding is determined from the histogram.

Figure 3:
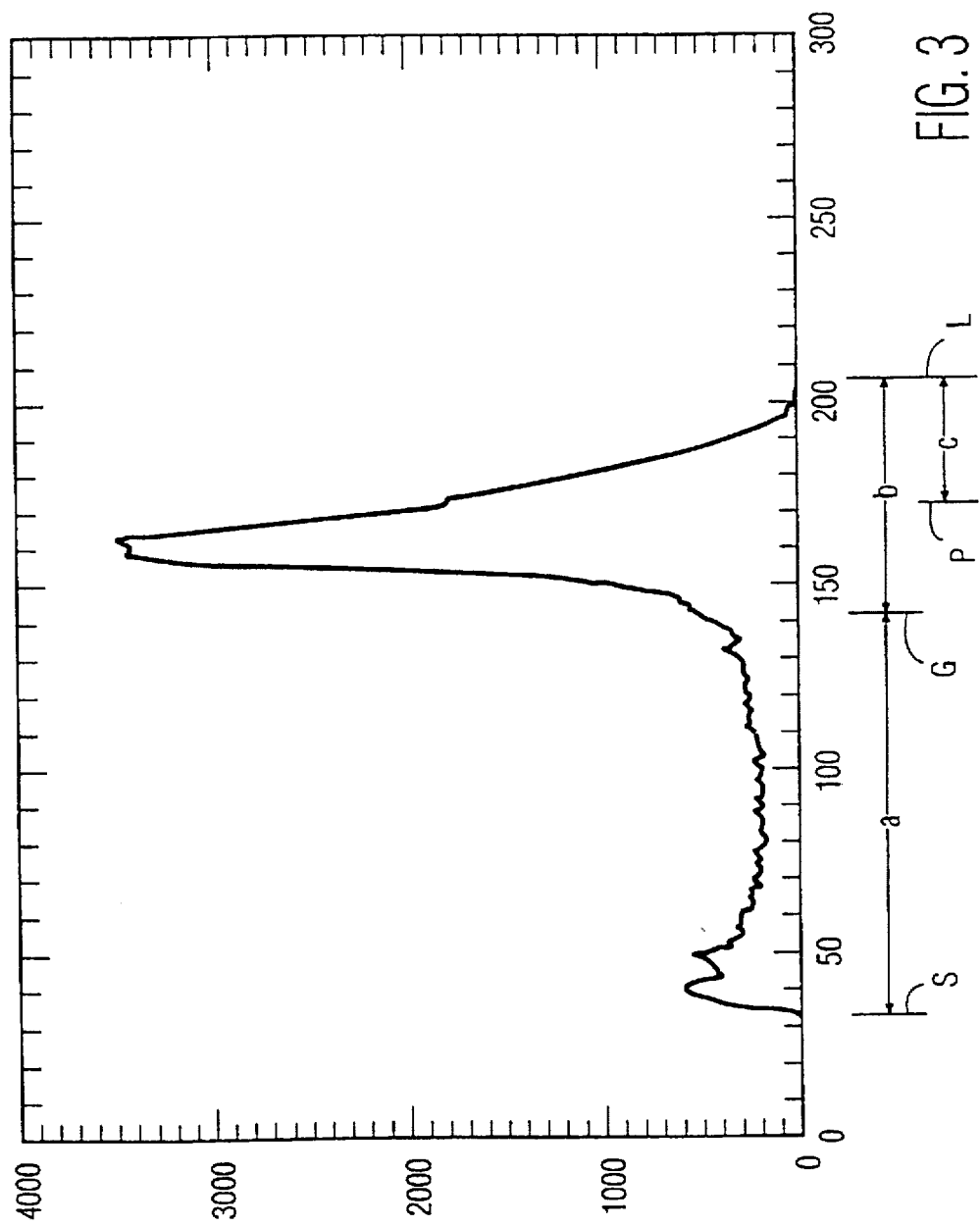
FIG. 3 is a histogram of the gray values of the pixels of a mammogram after background removal.

A typical histogram is shown in FIG. 3 and is seen to be subdividable into an interval "a" from the smallest gray level S in the histogram to a gray level G, which interval corresponds to the skin, and a narrower interval "b" from level G to the largest gray level L in the histogram, which interval corresponds to the interior of the breast. Interval "a" has a substantially low number of pixels at each gray level while interval "b" has a relatively high peak with steep sides. The interval "b" is chosen as the relevant interval of gray levels for thresholding. Gray level G is chosen such that interval "b" twice the interval "c" between gray level L and the gray level P at the peak of the histogram.

In accordance with the invention, each gray level in interval "b" is used as a threshold. Typically, in a 256 gray level image interval "b" contains at least 20 twenty gray levels, and often more than 50. Conveniently, these gray levels are successively used as a threshold level in either smallest to largest, or largest to smallest, order. In any event, a current threshold level is set at the first gray level interval "b" in the order.

Figure 2:
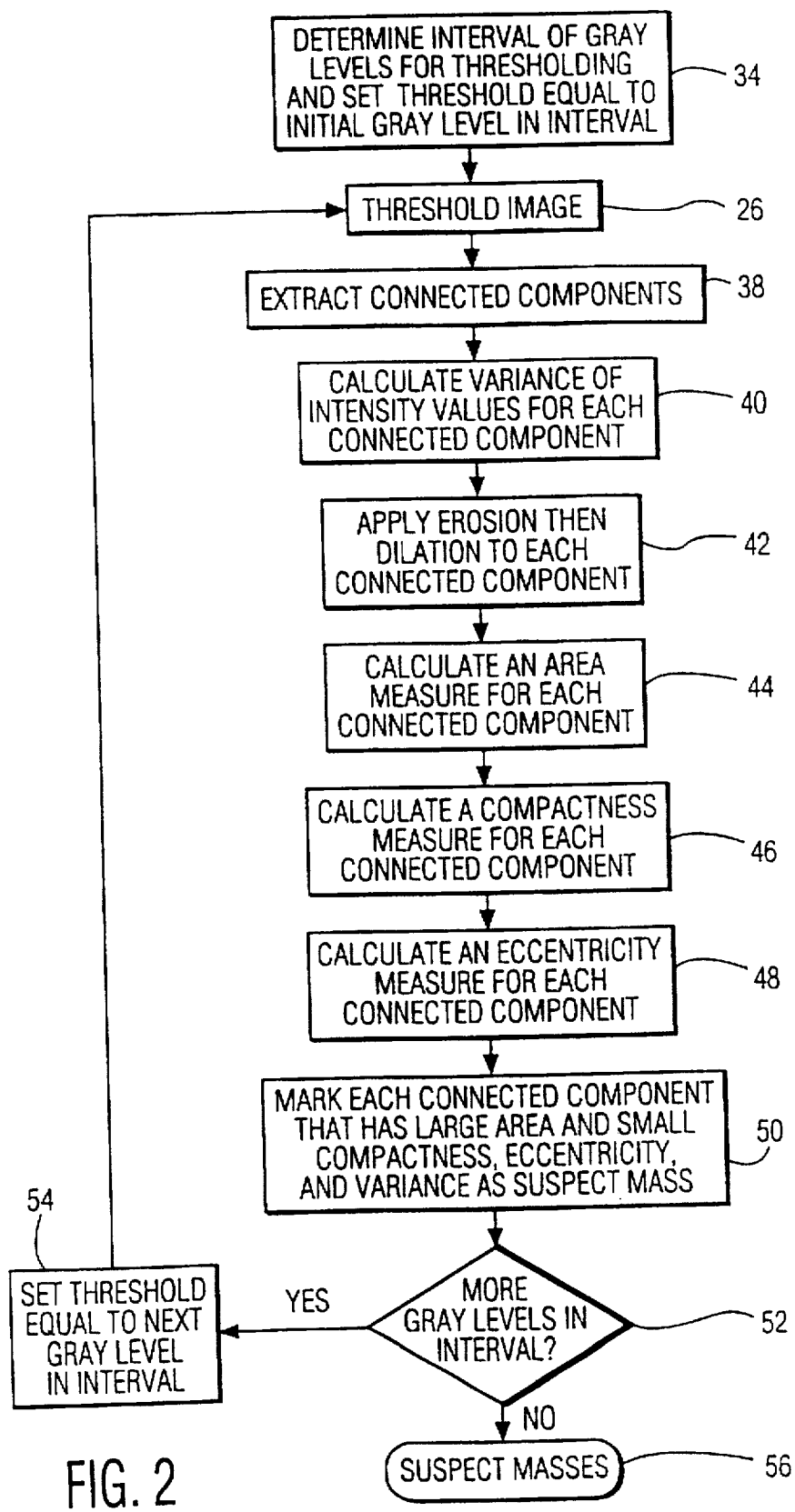
FIG. 2 is a flow chart indicating the processing performed by a computer in FIG. 1.

Next in the flowchart of FIG. 2, in step 36 the image is thresholded at the current threshold level to produce a binary image whose pixels having an intensity greater than or equal to the current threshold level are assigned the value one and whose pixels having an intensity less than the current threshold level are assigned the value zero. Alternatively, the thresholded image may be a grey scale image obtained from the image input to step 36, by copying all pixel intensities that are not less than the current threshold level and setting the pixels having an intensity less than the current threshold level to the value zero.

In step 38, spots referred to as "connected components" are extracted from the thresholded image. Each "connected component" is a set of pixels having non-zero values, in which any two pixels of the set are ultimately connected to each other via a run of adjacent pixels in the set. These sets are identified conveniently by the following phases: a) generating a Line-Adjacency Graph (LAG), b) scanning the LAG to determine the number of different connected components (CC's), and c) again scanning the LAG to create a mask image and several summary arrays that define and describe each CC.

The method to create an LAG in phase a) above is based on the description in the book "Algorithms for Graphics and Image Processing" by Pavlidis, Computer Science Press, 1982, pp. 116–120. It consists of for each line of the thresholded image, finding runs of adjacent non-zero valued pixels, comparing the position of the runs on the current and prior adjacent line, and recording any overlap.

Although the LAG specifies which lines overlap, it does not define a connected component. Thus in phase b), each the record of overlapping runs is scanned to determine to which CC each run belongs. Along the way, the total number of connected components is computed.

Once the set of CC's is known, then in phase c) a mask image and several data objects to define each CC are computed. The mask image is essentially the thresholded image in which all non-zero pixels contain the number of the CC to which they belong. The additional data objects include a vector containing the number of pixels in each CC, which is a measure of area, and an array defining a bounding box (minimum and maximum column and row) for each CC.

After the extraction of connected components, in step 40 the variance Var of the intensities of the pixels in each CC is computed separately for each CC in accordance with the following equation:

$$Var = \frac{1}{n} \sum_{i=1}^{n} (g_i - \mu)^2$$

where $g_i$ is the intensity of the ith pixel in the connected region, $\mu$ is the mean value of the intensities of the pixels in the connected region and n is the number of pixels in the connected region. Alternatively, a measure of uniformity might be used, for example, the inverse of the variance.

After, the computation of variance, the connected regions are smoothed in step 42 by erosion and then dilation. Preferably a structure element which is a 3 by 3 matrix of ones is used for each operation. These operations smooth sharp irregularities in the boundaries of the connected regions. Thereafter in step 44, an area measure A for each smoothed CC is computed, conveniently as the number of pixels therein. Then in step 46 a compactness measure Compact is computed for each CC as follows:

$$Compact = \frac{P^2}{A}$$

where P is the perimeter of the connected region and A is its area.

An eccentricity measure Ecc is formed in step 48 as follows:

$$Ecc = \frac{r_{max}}{r_{min}}$$

where $r_{max}$ and $r_{min}$ are the maximum and minimum distances between the center of the connected area and the perimeter.

Then in step 50, the aforementioned measures Compact, Ecc, Var and A are compared with threshold values $T_C$, $T_E$, $T_V$ and $T_A$, respectively for each CC. If Compact, Ecc, and Var are less than or equal to $T_C$, $T_E$, and $T_V$, respectively and A is greater than or equal to $T_A$, each pixel of the CC is marked as belonging to a suspect CC. After all CC's that were discriminated by the current threshold level are considered, then in step 52, it is tested whether there are more gray levels in the interval. If there are, then in step 54 the current threshold is changed to the next threshold level in order and step 26 is returned to where the original background removed image is thresholded at the new current threshold level. Steps 36 to 50 are repeated for each threshold level until it is determined at step 52 that there are no more gray levels remaining in the interval.

It should be appreciated that the marking of pixels as belonging to a suspect connected area is a cumulative operation. After, all threshold levels in the interval have been applied, then the result 56 is suspect masses revealed from any of the threshold levels.

Values of the thresholds used to test the measures A, Compact, Ecc and Var were obtained empirically from training with six images. The following values thus obtained have given good results with a 256 gray scale 480 by 520 pixel image, in which each pixel represents a square 0.4 mm on a side:

$T_A = 130$ pixels $T_C = 150$ $T_E = 2.7$ $T_V = 50$

In experiments run with respect to nine mammogram images, the automated procedure of the present invention successively marked all of the areas that had been marked by a radiologist as suspect, while marking one false positive in five of the nine images.

It should now be appreciated that the objects of the present invention have been satisfied. While the present invention has been described in particular detail, numerous modifications are possible within the intended spirit and scope of the invention.

What is claimed is:

1. A method of produciny a computer-enhanced radiologic image comprising:

irradiating a region of a body examined with X-ray radiation in a predetermined viewing direction;

receiving the X-ray radiation existing the region from said viewing direction within a two-dimensional field;

producing digital signals as a fuction of the X-ray radiation received, which digital signals correspond to an input two-dimensional array of digital pixels representing an image of the region of the body;

in response to said signals, storing said input two-dimensional array of digital pixals in a digital memory means accessible to a computer;

with said computer, processing the stored input two-dimensional array of digital pixels by thresholding at least a portion of the stored input array at, at least, 20 different intensity threshold levels to discriminate spots in said input two-dimensional array at the threshold levels, for each threshold level and each spot discriminated at said threshold level, forming a plurality of measures of said spot, including of its size and shape and of the variance or uniformity of intensity values of the digital pixels comprising said spot, and determining whether the formed plurality of measures fall within predetermined criteria, and producing an output two-dimensional array of digital pixels from the input array in which any spots whose formed measures meet said criteria at any threshold level are marked or enhanced, independently of whether or not corresponding spots meet said criteria at more than one threshold level; and displaying the output array of digital pixel as an image on a display means.

2. A method of producing a computer-enhanced radiologic image comprising:

receiving and storing in a digital memory means accessible to a computer an input two-dimensional array of digital pixels produced by a radiologic imaging apparatus representing an image of a region of a body;

with said computer, processing the stored input two-dimensional array of digital pixels by thresholding at least a portion of the stored input array at, at least, 20 different intensity threshold levels to discriminate spots in said input two-dimensional array to discriminate spots, for each threshold level and for each spot discriminated at said threshold level, forming a plurality of measures of said spot, including of its size and shape and of the variance or uniformity of intensity values of the digital pixels comprising said spot, and determining whether the formed plurality of measures fall within predetermined criteria, and producing an output two-dimensional array of digital pixels from the input array in which any spots whose formed measures meet said criteria at any threshold level are marked or enhanced, independently of whether or not corresponding spots meet said criteria at more than one threshold level; and producing an output two-dimensional array of digital pixels from the input array in which any spots whose formed measures meet said criteria are marked or enhanced.

3. A system for producing a computer-enhanced radiologic image comprising:

means including an X-ray source, for radiating a region of a body being examined with X-ray radiation in a predetermined viewing direction;

means for receiving the X-ray radiation exiting the region from said viewing direction within a two-dimensional field;

means for producing digital signals as a function of the X-ray radiation received, which digital signals correspond to an input two-dimensional array of digital pixels representing an image of the region of the body;

a computer;

a digital memory means accessible to said computer;

means for, in response to said signals, storing said input two-dimensional array of digital pixels in said digital memory means;

wherein said computer is configured for processing the stored input two-dimensional array of digital pixels by thresholding at least a portion of the stored input array at a plurality of different intensity threshold levels to discriminate spots in the input two-dimensional array to discriminate spots, for each threshold level and for each spot discriminated at said threshold level, forming measures of the size and shape of said spot and of the variance or uniformity of intensity values of the digital pixels comprising said spot, and determining whether the formed measures fall within predetermined critria, and producing an output two-dimensional array of digital pixels from the input array in which any spots whose formed measures meet said criteria are marked or enhanced; and display means for displaying the output array of digital pixels as an image.

4. A system for producing a computer-enhanced radiologic image comprising;

a computer;

a digital means accessible to said computer;

means for receiving and storing in said digital memory means, an input two-dimensional array of digital pixels representing an image of a region of a body produced by radiologic imaging apparatus;

wherein said computer is configured for processing the stored input two-dimensional array of digital pixels by thresholding at least a portion of the stored input array at, at least, 20 different intensity threshold levels to discriminate spots in the input two-dimensional array at the threshold levels, for each threshold level and for each spot discriminated at said threshold level, forming a plurality of measures of said spot, including of its size and shape and of the variance or uniformity of intensity values of the digital pixels comprising said spot, and determine whether the formed plurality of measures fall within predetermined criteria, and producing an output two-dimensional array of digital pixels from the input array in which any spots whose formed measures meet said criterial at any threshold level are marked or enhanced, independently of whether or not corresponding spots meet said criterial at more than one threshold level, and producing an output two-dimensional array of digital pixels from the input array in which any spots whose formed measures meet said criteria are marked or enhanced.

* * * * *